Figure 1:
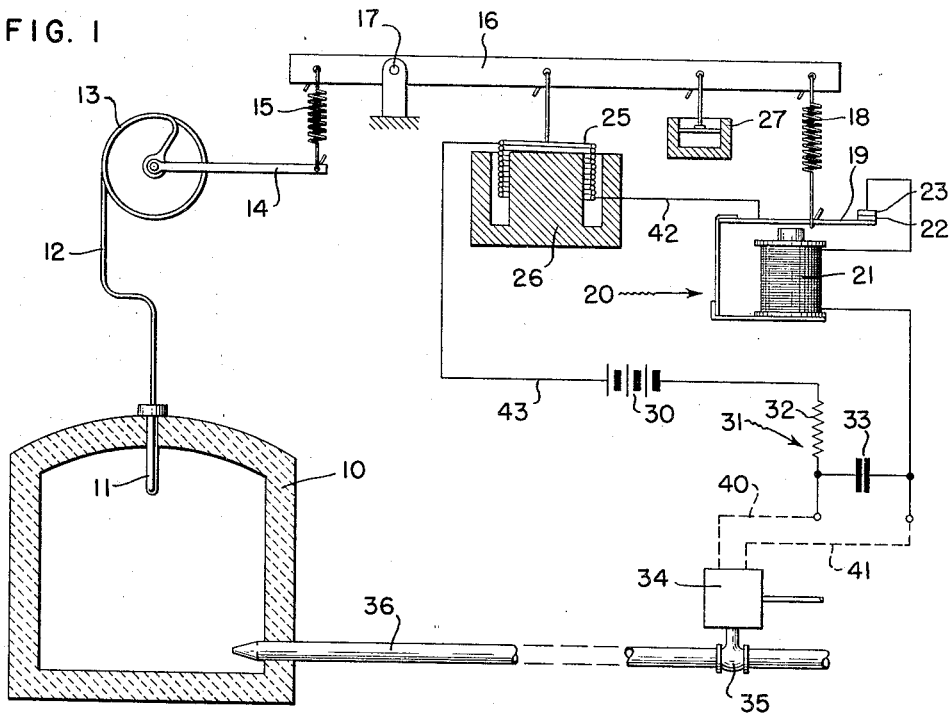

Oct. 2, 1956

R. J. EHRET 2,765,415

ELECTRICAL VIBRATORY RELAY APPARATUS

Filed April 27, 1953

INVENTOR.
ROBERT J. EHRET
BY Arthur H. Swanson
ATTORNEY.

United States Patent Office 2,765,415
Patented Oct. 2, 1956

2,765,415

ELECTRICAL VIBRATORY RELAY APPARATUS

Robert J. Ehret, Philadelphia, Pa., assignor to Minneapolis-Honeywell Regulator Company, Minneapolis, Minn., a corporation of Delaware Application April 27, 1953, Serial No. 351,320

7 Claims. (Cl. 307—97)

A general object of the present invention is to provide an improved apparatus for changing an input energy form, which may be represented by mechanical force, into a second energy form which is more suitable for controlling purposes. More specifically, the present invention is concerned with improvements in so-called force balanced apparatus for converting or transducing a mechanical input force into an electrical current of proportional magnitude.

In many present day controls, means are provided to measure the magnitude of a variable to produce a control signal of proportional magnitude. This control signal may be in the form of an electrical current which may readily be transmitted to a remote point for control or indicating purposes. In the prior art, it has been common practice to use a force balance type of apparatus for converting an input signal into an output electrical current. One form of such apparatus is illustrated in the Lenehan patent, 1,813,177, issued July 7, 1931. The Lenehan patent shows a pivoted beam to which a deflecting mechanical force is applied. Upon movement of the beam, an electrical contact carried directly by the beam is closed and an electric current flow is established in a force balancing coil attached to the beam. This current flow is employed to force balance the input force of the beam and serves also as an output signal. This type of prior art apparatus is subject to a disadvantage traceable directly to the contact being carried directly by the beam. Due to the necessarily small movement and high inertia of the beam, the contacts are continually subjected to a frying action which seriously limits their useful life. Moreover, the high inertia of the beam interferes with and restricts the freedom of the contacts to open and close. To achieve some degree of stability with this prior art apparatus, therefore, it is essential for the components to be extremely small and of light weight in order to keep the inertia of the beam low and the frying of the contacts at a minimum.

In accordance with the present invention, there is provided an apparatus which has the advantages of the prior art devices in producing an output electric current proportional to an input force, but which inherently is more rugged and reliable, and eliminates or minimizes the inertia and electrical contacting difficulties present in the prior art devices.

It is accordingly a more specific object of the present invention to provide a new and improved apparatus for converting an input mechanical force into an output electrical current which is proportional in magnitude to the input force.

Another object of the present invention is to provide a force balance transducer which is operative to convert an input mechanical force, representative of the magnitude of a measured variable, into an output electrical current of proportional magnitude and which may be employed to create a balancing mechanical force for the input mechanical force.

Still another object of the present invention is to provide a deflection or displacement detecting element which comprises apparatus for converting the displacement of a detecting element into a mechanical force from which an electrical signal proportional to the force may be derived.

A further object of the present invention is to provide a force balancing apparatus which includes a movable member the movement of which is converted into a force acting upon a self-oscillating device to produce an electric current which is employed to create a force balancing the said first mentioned input force.

The various features of novelty which characterize the invention are pointed out with particularity in the claims annexed hereto and forming a part of the specification. For a better understanding of the invention, its advantages, and specific objects attained with its use, reference should be had to the accompanying drawings and descriptive matter in which is illustrated and described preferred embodiments of the invention.

Figure 2:
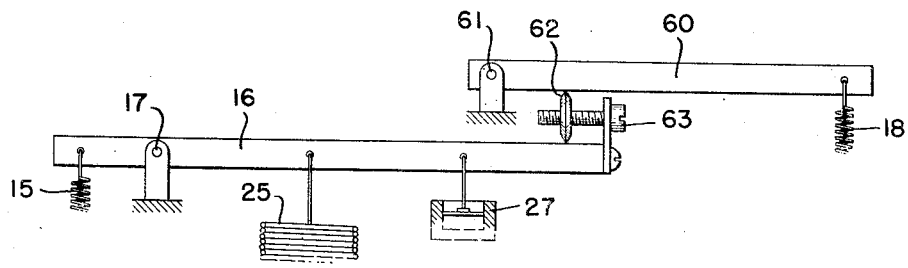

Of the drawings:

Figure 1 is a diagrammatic showing of the present apparatus as applied to a furnace temperature control; and Figure 2 shows a modified portion of the apparatus of Figure 1.

Referring first to Figure 1, the numeral 10 represents a furnace whose temperature is being controlled. For sensing the temperature of the furnace there is provided a thermal sensing unit 11 of the expansible fluid type. The sensing element 11 is arranged to produce a pressure which acts through a connecting conduit 12 on a helical element 13. The element 13 is effective to respond to pressure changes from the sensing element 11 and to produce an output motion which is indicated by the movement of the output arm 14.

The movement of the arm 14 is converted into a force by means of a spring 15 which is connected between the arm 14 and a pivoted movable member or beam 16 which is pivoted at 17. Any movement of the member 14 is converted into a force which will tend to cause movement of the beam 16.

Connected to the right end of the beam 16 is a further resilient member in the form of a spring 18. This spring is arranged for connection between the beam 16 and an armature 19 of a relay 20. This relay comprises, in addition to the armature 19, a relay coil 21 and a pair of contacts 22 and 23 which are normally biased to a closed position by the action of the spring 18 acting between the beam 16 and the armature 19. The electrical contacts 22 and 23 are also in series with the coil 21 of the relay.

Also associated with the right hand portion of the beam 16 is a current force balancing element for the beam which comprises a coil 25 which cooperates with a pot magnet 26.

If the apparatus is subject to considerable vibration, it may be essential to provide a dashpot assembly 27 which is also connected to the right hand portion of the beam 16. This will serve to damp out any vibrating tendencies of the beam 16 due to external causes.

A battery 30 is provided for the electrical circuit of the apparatus and to eliminate fluctuations in the electrical circuit there is provided a filter 31 which comprises a resistor 32 and a condenser 33.

The output electrical current from the filter 31 may be applied to a suitable current to pressure transducer indicated by the block 34. This apparatus may take the form of the current to pressure transducer shown in the copending patent application of Frederick W. Side, Serial No. 317,908, filed October 31, 1952. This transducer 34 is effective to regulate the pressure applied to a pneumatically actuated valve 35 which is located in the conduit 36. The conduit 36 may conduct a suitable combustible mixture to the furnace 10 with the flow thereof regulated by the valve 35 in accordance with the temperature desired within the furnaces.

In considering the operation of the present apparatus, it will be noted that the relay 20 is a self-oscillating type apparatus. Normally, the force of the spring 18 will move the armature 19 in a direction to close the contacts 22 and 23. As soon as the contacts close, an electrical circuit is completed for the coil and this electrical circuit may be traced from the positive terminal of the battery 30 to the filter resistor 32, conductor 40, transducer 34, conductor 41, coil 21, contacts 22 and 23, armature 19, conductor 42, force balancing coil 25, and conductor 43 back to the negative terminal of the battery 30. The current flowing through the coil 21 will cause the armature 19 to move downward adjacent the coil 21. This will move the contact 22 out of engagement with contact 23 to break the last traced electrical circuit. As soon as this circuit is broken, the force of the spring will again move the armature back so that the contact 22 will engage contact 23. It will thus be seen that the relay 20 is continuously oscillating and is continuously making and breaking the electrical circuit through the force balancing coil as well as through the output transducer 34. The changing of the oscillating or pulsing rate and pulse rate duration of the relay 20 will be a direct function of the force applied to the armature 19 by the spring 18. The manner in which this force is varied will now be considered.

For a particular temperature within the furnace 10, the sensing element 11 will establish in the helical spiral 13 a pressure proportional to the temperature and this pressure will be effective to move the output arm 14 by an amount which is directly proportional to the temperature of the furnace 10. This output motion of the arm 14 is converted into a force on the left end of the beam 16 by means of the spring 15 and the force from the spring 15 will tend to move the beam 16 in a counter-clockwise direction about the pivot 17. As the beam 16 tends to move in a counter-clockwise direction, the right end of the beam will move upward and the upward movement will stretch the spring 18 causing an added force to be applied to the armature 19. The added force on the armature 19 will result in the contacts 22 and 23 being held in engagement for a longer period and the contacts being reclosed in a shorter period of time than if the force from spring 18 were relaxed. There will thus be produced in the electrical circuit from the battery 30 a pulsating current flow whose average direct current magnitude is proportional to the time operation of the opening and closing of the contacts 22 and 23 of the relay 20. As the current flow from the battery 30 passes through the force balancing coil 25, the force balancing coil will apply to the beam 16 a counter-balancing force which force will tend to move the beam 16 in a clockwise direction to eliminate the counter-clockwise movement introduced by the arm 14 acting through the spring 15.

For a particular temperature within the furnace 10, there will be applied to the beam 16 an input force and this input force will be counterbalanced by the force from the force balancing coil 25 and the apparatus will come to a state of equilibrium or balance with the beam 16 remaining in a fixed position and the armature 19 operating in an oscillating manner to open and close the output electrical circuit to create an average direct current flowing in the circuit which is proportional to the temperature within the furnace 10. If the temperature within the furnace 10 changes, the forces acting upon the beam 16 will change and the apparatus will stabilize or balance at some new position where again the output current will be proportional to the temperature within the furnace.

From the foregoing it will be seen that the output electrical current to the force balancing coil 25 and to the current-to-pressure transducer 34 is produced by the oscillatory movement of the armature 19. As this armature has a very low mass it is possible to oscillate the armature at a high rate so that the output current is now uniform and capable of producing a wider range of output currents. Further, as the contacts 22 and 23 positively open and close, there is no undue "frying" of the contacts which will tend to score them or burn them and the contact life is considerably extended.

Figure 2 shows a modification of the apparatus of Figure 1 with this modification being directed to increasing the motion of the principal beam of the apparatus. Thus, the beam 16 is shown as having an input through the spring 15 with the input force acting to cause counter-clockwise movement of the beam 16. This counter-clockwise movement is applied to a second beam 60 which is pivoted at 61. An adjustable motion transmitting member 62 is carried by the right end of beam 16 and is adjustable to establish a bearing surface between the beam 16 and the beam 60 by a threaded adjustment 63. The spring 18 is fastened to the right end of the secondary beam 60 instead of to the right end of the beam 16 as is the case of Figure 1.

The arrangement shown in Figure 2 may be of utility where it is desired to extend the range of forces available upon the spring 18 acting on the armature 19 of the apparatus of Figure 1. Thus, any movement of the principal beam 16 will be extended and amplified by the linkage arrangement including the bearing surface 62 and the secondary beam 60 so that the movement of the right end of the beam 16 will be amplified. As the resultant output force from the spring 18 is proportional to the movement of the beam to which the upper end is attached, it will be seen that a greater force range will be available with the apparatus of Figure 2. In all other respects, the apparatus if modified as in Figure 2 will operate the same as that of Figure 1.

While, in accordance with the provisions of the statutes, there has been illustrated and described the best forms of the embodiment of the invention known, it will be apparent to those skilled in the art that changes may be made in the forms of the apparatus disclosed without departing from the spirit of the invention as set forth in the appended claims, and that in some cases certain features of the invention may be used to advantage without a corresponding use of other features.

What I claim as new and desire to secure by Letters Patent is:

1. A transducer comprising, a movable member arranged to have applied thereto an input force which varies in accordance with the magnitude of a variable, means including a spring for detecting the motion of said movable member and converting said motion into a second force, a vibrating circuit breaker mounted independently of said member arranged to have applied thereto from said spring said second force so as to vary the circuit breaking duration of said breaker, and an electrical force balancing coil connected to said member having a current from said breaker flowing therethrough to create a balancing force on said movable member.

2. Signal converting apparatus comprising, a movable member having an input force applied thereto tending to cause movement of said member, a motion detector connected to said member arranged to produce an output energy which is proportional to said input force, said detector comprising an oscillatory member connected to said movable member by a resilient means and having applied thereto by said resilient means a force proportional to the motion of said movable member and having an output signal proportional to said force, and means responsive to the magnitude of the output signal for applying to said movable member a counterbalancing force to balance the input force to said movable member.

3. A transducer comprising, a movable member arranged to have applied thereto a force proportional to the magnitude of an input variable, means responsive to the movement of said member for producing an output current proportional to the input force, said last-named means comprising a self-oscillating relay mounted independently of said movable member and having an armature arranged to oscillatingly make and break an electrical circuit for said relay and having a resilient member connected between said movable member and said armature to vary the force on said armature by an amount proportional to the movement of said movable member, and a current force balancing member connected to said movable member having a current flowing therethrough proportional to the oscillatory movement of said armature and producing a force balancing action on said movable member to balance said input force.

4. Apparatus of the class described comprising, a movable member arranged to have applied thereto a force proportional to the magnitude of an input variable, means responsive to the movement of said member for producing an output current proportional to the input force, said last-named means comprising a relay having an armature, a coil, and a pair of contacts which are biased toward a closed position and are opened by said relay when said coil is energized and having a resilient member connected between said member and said armature to vary the force tending to close said pair of contacts so that said relay will operate in an oscillatory manner in accordance with the movement of said member, an electrical circuit whose current flow is interrupted by said movable member included in said circuit to produce a force to balance said input force acting on said member.

5. A signal conversion apparatus comprising, a movable member, means for applying an input force to said member which force varies in accordance with the magnitude of a variable, current producing means for creating a current proportional to the deflection of said member, said current producing means comprising a pair of contacts mounted independently of said movable member and being variably biased by the motion of said member in a closed direction and an electromagnetic coil energized by said contacts when closed for urging said contacts to open so that said contacts are actuated in an oscillating manner to open and close an output electrical circuit, and means responsive to an output current produced by the opening and closing of said output circuit for applying to said movable member a force to balance said input force.

6. Conversion apparatus comprising a pivoted beam arranged to have applied thereto an input force which varies in accordance with an input variable, means responsive to the deflection of said beam about said pivot for producing an output current proportional to the deflection of said beam, said means comprising a pair of contacts mounted independently of said pivoted beam and being variably biased by the motion of said beam in a closed direction and an electromagnetic coil energized by said contacts when closed for urging said contacts to open so that said contacts are actuated in an oscillating manner to open and close an output electrical circuit, and a coil having said output current controlled by said last named means flowing therethrough, said coil producing a force on said pivoted beam to balance the input force from said variable.

7. A transducer comprising, a movable member arranged to have applied thereto an input force which varies in accordance with the magnitude of a variable, a force balancing element for applying to said movable member a counterbalancing force to said input force, a motion detecting means including a second member connected to said movable member by a resilient means and responsive to a force created by the motion of said movable member acting through said resilient means for making and breaking an electrical circuit in accordance with the motion of said movable member, and means connecting said motion detecting means to said force balancing element so that said force balancing element will balance the input forces applied to said movable member.

References Cited in the file of this patent

UNITED STATES PATENTS

| | | |
|---|---|---|
| 1,146,925 | Conrad | July 20, 1915 |
| 1,392,908 | Bryce | Oct. 11, 1921 |
| 1,813,177 | Lenehan | July 7, 1931 |
| 1,855,205 | Schur | Apr. 26, 1932 |
| 2,104,972 | Cunningham | Jan. 11, 1938 |
| 2,633,349 | Williams | Mar. 31, 1953 |